United States Patent [19]
Callahan

[11] 3,938,092
[45] Feb. 10, 1976

[54] SYSTEM FOR TELECOMMUNICATING VEHICLE OPERATION DATA BETWEEN A GROUND STATION AND A REMOTE DATA PROCESSING STATION

[75] Inventor: Bernard E. Callahan, Hoffman Estates, Ill.

[73] Assignee: Vapor Corporation, Chicago, Ill.

[22] Filed: Sept. 6, 1974

[21] Appl. No.: 503,725

Related U.S. Application Data

[62] Division of Ser. No. 379,371, July 16, 1973, Pat. No. 3,864,731.

[52] U.S. Cl. .............. 340/150; 360/12; 346/33 D
[51] Int. Cl.²... G11B 1/00; G11B 5/00; G01D 9/00; H04Q 9/00
[58] Field of Search ........... 340/149 R, 147 R, 150; 346/33 M, 33 D; 360/8, 19, 12

[56] References Cited
UNITED STATES PATENTS

| | | | |
|---|---|---|---|
| 3,461,429 | 8/1969 | Gray | 346/33 M |
| 3,665,397 | 5/1972 | Di Napoli et al. | 340/147 R |
| 3,757,089 | 9/1973 | Hockler | 340/149 A X |
| 3,792,445 | 2/1974 | Bucks et al. | 346/33 D |

OTHER PUBLICATIONS

Application Note — Teledyne Corporation, "Locomotive Management Data Recording System," Feb. 1969.

"Train Handling Tape Recorder," *Progressive Railroading*, May–June, 1973.

*Primary Examiner*—Donald J. Yusko
*Attorney, Agent, or Firm*—Francis J. Lidd

[57] ABSTRACT

A tape recorder module vehicle operation data, onboard. The module is removed from the vehicle and data is played back at a ground station. A telecommunication link exists with a remote data processing system for processing the played back data.

4 Claims, 4 Drawing Figures

SYSTEM FOR TELECOMMUNICATING VEHICLE OPERATION DATA BETWEEN A GROUND STATION AND A REMOTE DATA PROCESSING STATION

The following is a divisional application of patent application 379,371 filed July 16, 1973, now U.S. Pat. No. 3,864,731, for the same inventor.

FIELD OF THE INVENTION

The present invention relates to data processing systems, and more particularly to a system for recording vehicle data on board and telecommunicating the recorded data from a ground station to a remote data processing station.

BRIEF DESCRIPTION OF THE PRIOR ART

Many vehicular data recording systems have evolved during the years, in particular those applied to railroad locomotives where the primary objective was to monitor a locomotive engineer's operations. The classic method used incorporated analog transducers which detected the occurrence of particular events, such as dynamic braking, speed conditions over a reference level, and other emergency conditions. Usually, the transducers were connected to AC amplifiers which then drove a multiple channel strip chart recorder. The classic system incorporated a great deal of expensive hardware that had to be constantly calibrated. In addition, the reliability of such units was relatively low. The greatest disadvantage was the long length of charts that had to be analyzed by trained persons. As will be appreciated, the process is extremely laborious and does not readily lend itself to automation.

A more recent recording system for locomotives is known in the trade as LODAR. This is an analog system for recording speed, distance and particular events. As in the case of the previously mentioned analog system, the LODAR system lacked reliability due to the relative complexity of the many components used in the system. However, the LODAR system made use of data processing. By this we mean that information was recorded by the system and then transmitted to a computer that digested and analyzed the data.

Unfortunately, the LODAR system depended upon a special data terminal for communicating the data to a computer. Accordingly there was a lack of compatability between the LODAR system and readers that were available at the railroads.

Other prior art systems include the concept of recording on board the locomotive and then using a minicomputer for editing data and analyzing data. Unfortunately, installation of these mini-computers on the locomotives is a costly proposition and is thus impractical.

BRIEF DESCRIPTION OF THE INVENTION

The present invention utilizes a digital system for recording speed, distance, and preselected events. The types of data recorded by the present invention is the same types of data that were previously recorded. The invention resides in the digital technique and related hardware that is employed to accomplish data recording. By using digital methods, the hardware of the invention is greatly simplified thus increasing the system reliability. In addition, the digital methods evidence the recording of data with great accuracy.

A further advantage of the present invention resides in the compression of data on a magnetic tape. More particularly, if the system fails to detect changes in locomotive speed, or other events, rather than wasting tape and registering non-occurence, a tape recorder in the system is not actuated so that a minimum of tape is used. This compresses or compacts data onto the magnetic tape, and as a result, when feed back occurs, there will be no "silent" intervals.

Although generally similar systems for recording data have been known, as exemplified by U.S. Pat. No. 3,158,426, the particular application of such systems to surface transportation vehicles is novel.

In marked contrast to the prior art, the present invention incorporates a tape recorder module with tape reels incorporated therein. After recording data, the module is plugged into a playback unit which transmits data from the recorded tape, through a telecommunications terminal, to a data processing center. In a preferred embodiment of the present invention, the terminal is not on the vehicle, such as a locomotive, but is rather at a ground dispatch station. Such stations are prevalent in our railroad system and usually incorporate a telecommunications terminal. Such terminals may be of the Teletypewriter type. By recording data on the tape, in accordance with a conventional code, the terminal may be employed to transmit the data to a data processing center which can analyze and format the data in report form that is easily understood by railroad personnel.

The above-mentioned objects and advantages of the present invention will be more clearly understood when considered in conjunction with the accompanying drawings, in which:

DETAILED DESCRIPTION OF THE PRESENT INVENTION

Figure 1:
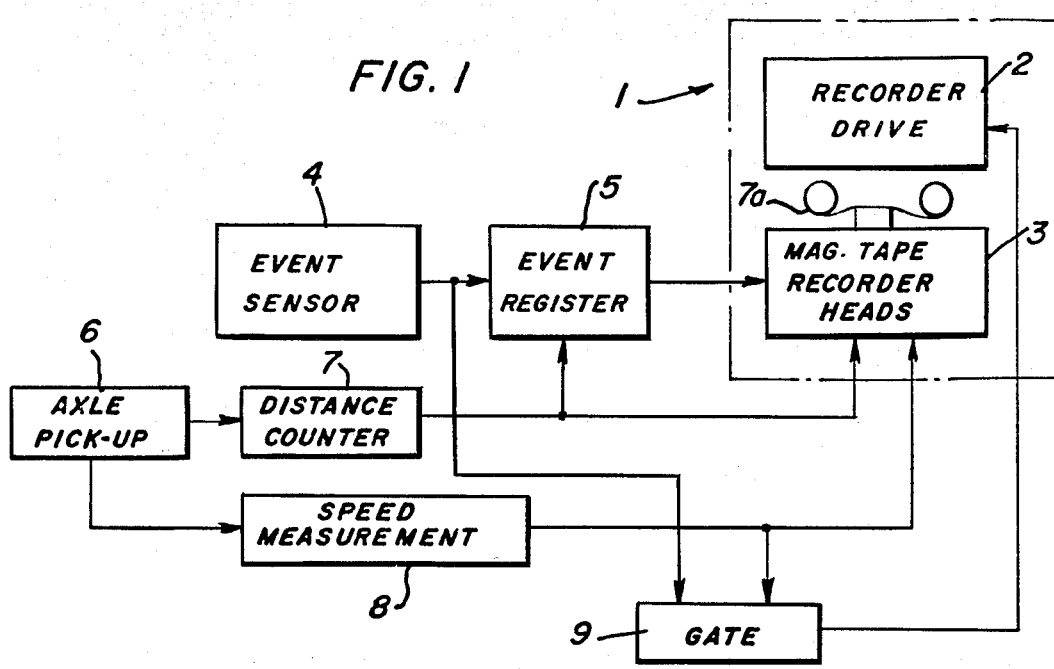
FIG. 1 is a system block diagram of the recording portion of the present invention.

Referring to the figures, and more particularly FIG. 1 thereof reference numeral 1 generally denotes a tape recorder module that includes a drive 2 and recorder heads 3 for multiple channel recording. The module 1 is so constructed that the entire unit can be plugged into and out of the remainder of the system. An event sensor 4 detects the occurrence of certain conditions on a vehicle. For example, on a locomotive, if dynamic braking occurs, the sensor 4 will detect this condition and form a corresponding coded character stored in register 5. An axle pickup 6 generates signals at the rate of 30,000 per mile. A distance counter 7 accumulates the signals produced by the pickup 6 and transmits the distance data to the recorder heads 3. The data from pickup 6 is also transmitted to a speed measurement circuit 8. The recorder heads 3 are provided with inputs connected to the event sensor 4 and the output of the speed measurement means 8. If either an event occurs or the speed changes as the axle pickup generates sequential signals, or a maximum distance is reached, the gate 9 is enabled thus actuating the recorder drive 2. However, if neither an event occurs nor the speed changes, the drive will not be actuated and the tape shown at 7a will not be moved. As a result, tape is conserved during non-occurrences. This effects compression and minimizes the amount of tape that is used to record data from the system. Also, playback of the tape and subsequent data processing requires a minimum amount of time inasmuch as "silent" intervals are absent.

Figure 2:
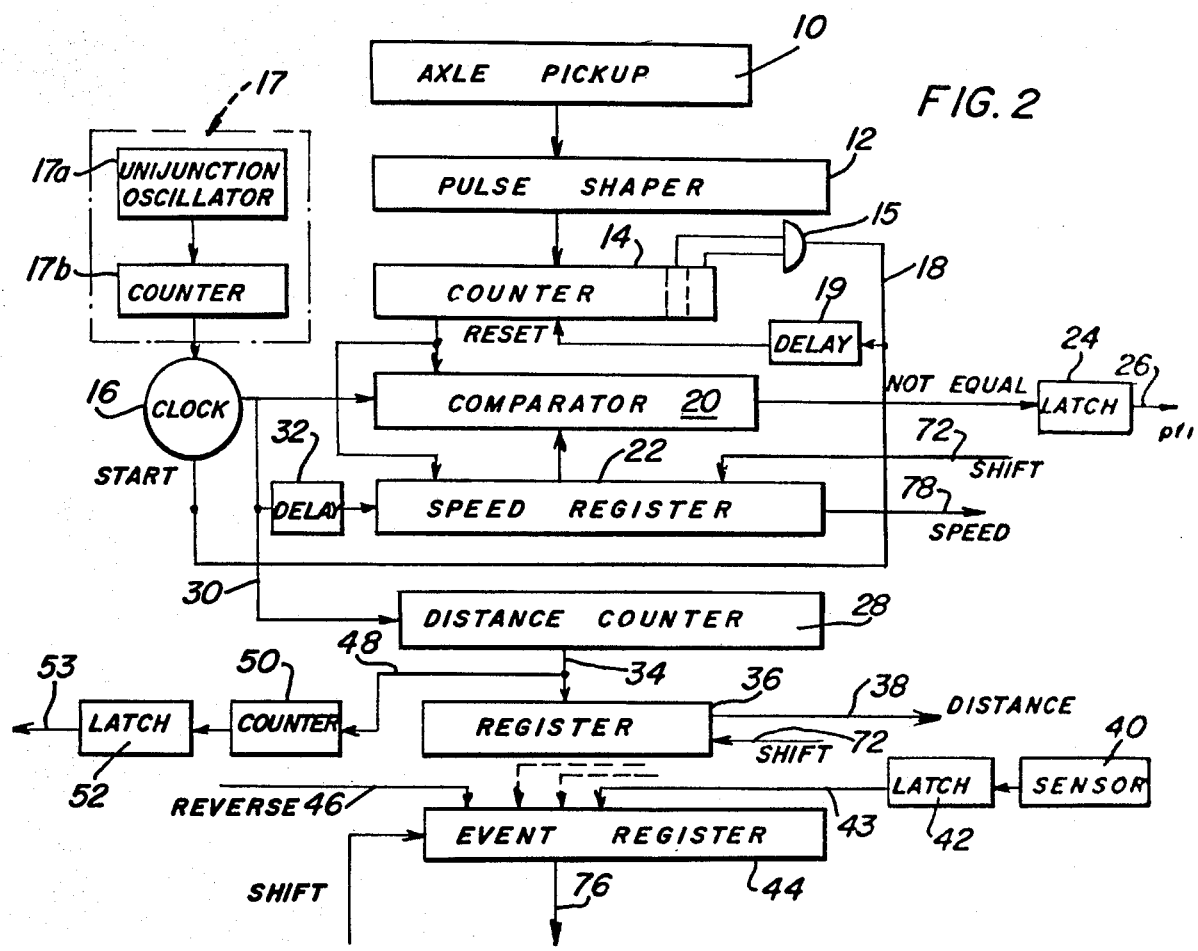
FIG. 2 is a logic block diagram of the present invention which illustrates the circuitry employed to record speed, distance, and other preselected events.

FIG. 2 illustrates in block diagram form the circuitry utilized to register the occurrence of speed, distance and particular events.

An axle pickup 10 is mounted to the wheel of the vehicle and generates a signal at the rate of 30,000 pulses for each mile of vehicle travel. This distance is exemplary only. The pickup may be of a conventional type such as manufactured by Electro-Products, Inc. This type of pickup is of the magnetic type that senses the rotation of gear teeth connected to the vehicle wheel. A second type of pickup is manufactured by Vapor Corporation and is known in the trade as the End of Axle Pickup. The signal from the pickup consists of a pulse generated 60 times for each revolution of the vehicle wheel. A pulse shaping circuit 12 conditions the signal from pickup 10. The output from the pulse shaper 12 is fed to a conventional binary counter 14 which is incorporated in a integrated circuit chip. As an example, Texas Instrument Unit 7493 may be employed. In an operating embodiment, the type of logic used throughout the system is T²L logic such as exemplified by Texas Instrument series 7400 circuits. The counter 14 will accumulate a particular count from the axle pickup 10 and pulse shaper 12, after the vehicle has traversed a distance of one-twentieth mile. In the preferred embodiment of the present invention, counter 14 is an 11 stage counter. The last two stages of the counter will contain binary ones when the counter has accumulated a count of 1536. An AND gate 15 has its two inputs connected to the 10th and 11th stages of counter 14. The gate is enabled when the count of 1536 occurs. The output 18 from the gate 15 is connected to a clock 16, the line 18 carrying a start signal for the clock 16. A timing circuit generally indicated by reference numeral 17 includes a programmable unijunction oscillator 17a having its output connected to the counter 17b. When a start signal is present on line 18, the clock will produce a pulse after the counter 17b has been incremented to a preselected count.

By way of example, the axle pickup 10 generates 60 pulses per revolution of the vehicle wheel to which it is connected. The counter includes a count divider to divide the pulses at the input to the counter by a factor of 4. As a result, four revolutions of the vehicle wheel are required to obtain a count of 60. At 60 miles per hour, a locomotive wheel travels 88 feet per second. Typically, the locomotive wheel is 10 feet in circumference. This means that after four revolutions, the locomotive has travelled 40 feet. The time required to traverse the forty feet distance is obtained by calculating 40/88 = 0.455 seconds (15/33 seconds).

This means that the clock 16 should generate a single pulse having a width equal to 0.455 seconds. This can be obtained by having the counter 17b accumulate a count of 15 from the unijunction oscillator 17a before the signal from clock 16 is generated. With the clock pulse being 0.455 seconds, the count accumulated in the first nine stages of counter 14 will equal the speed of the locomotive at the time AND gate 15 is enabled, starting clock 16 and comparator 20.

A delay 19 is connected between line 18 and a reset terminal in the counter 14. The purpose of the delay is to enable readout from the counter 14 to the comparator 20 and the shunt connected speed register 22.

After an enabling pulse is transmitted from clock 16 to the comparator 20, a comparison is made between present speed in counter 14 and the speed of the vehicle as it existed during a previous clock cycle. If the speeds are equal within 1 mile per hour, no output occurs. If there is a difference in speed by at least 1 mile, an output from the comparator becomes energized and latch type flip-flop 24 is set thereby creating a print function signal $PF_1$ at 26. The occurrence of signal 26 will initiate the system tape recorder as will be explained hereinafter.

The output from clock 16 is fed along lead 30 to distance counter 28. The clock output is also connected to delay 32 which causes an update of the speed register 22. More particularly, the data stored in counter 14 will be shifted to speed register 22 once an enabling pulse is received from delay 32. This occurs immediately preceding reset of counter 14. The distance counter 28 has an output at 34 which counts the number of sequential increments of one-twentieth mile. When clock 16 generates a pulse, the distance counter 28 will parallel dump the count therein into register 36. The register 36 will include data corresponding to the distance travelled by the locomotive during the last one-twentieth of a mile. Upon the application of a shift signal to the register 36, as explained hereinafter, the register will readout the data contained therein on distance line 38 which is the distance the locomotive has travelled since the last speed change. The data for the speed measurement is available on lead 78 from the speed register 22.

Up to this point, the system has been explained in terms of measuring speed and distance. However, these parameters will not be recorded by the system unless the speed has changed during subsequent one-twentieth of a mile intervals, or if a particular event has occured.

Typical events for a locomotive that are recorded include the occurence of dynamic braking, the setting of the power control throttle, the switching of the direction lever between forward and reverse, or other emergency conditions. Typically, a sensor 40 is connected to a related section of the locomotive. For example, an appropriate sensor could be connected to the dynamic braking circuitry of the locomotive. When dynamic braking current exists, the sensor 40 is energized and causes the connected latch 42 to generate an event signal on line 43. The event signal is loaded into a preselected stage of event register 44. Similarly, if a locomotive is switched to a reverse setting, a signal will be generated on line 46 and a respective stage of the event register 44 will be set. The input to the event register includes other leads shown by dotted lines to indicate the connection of other event sensors. The event register 44 has an output lead 76 which will serially readout the data contained in the register, stage by stage. Certain stages will contain a binary 1 indication if a respective event has occurred. Data in the register 44 is readout when a shift occurs on the indicated shift line. The generation of the shift signal on this line will be explained hereinafter.

Although the previous discussion mentions that the system will not record if there are no speed changes, or events do not occur, this is not precisely the case. Means are built into the system to cause recording of data in the event the vehicle has travelled 1½ miles without any events occurring or speed changes occuring. A counter 50 has its input connected by lead line 48 to the output of the distance counter 28. When the distance counter 28 has counted 1½ miles without events or speed changes occurring, it will set a latch flip-flop 52 that generates a print function signal PF$_2$ at 53. As will be appreciated later, the occurrence of this signal will cause an automatic recording of data from the event register 44. However, if a vehicle is travelling a long distance without events occurring or speed changes occuring, rather than having a long length of tape to be analyzed, the data is compressed because recording has only occurred every one and a half miles. Accordingly, data compression has truly occurred.

Figure 3:
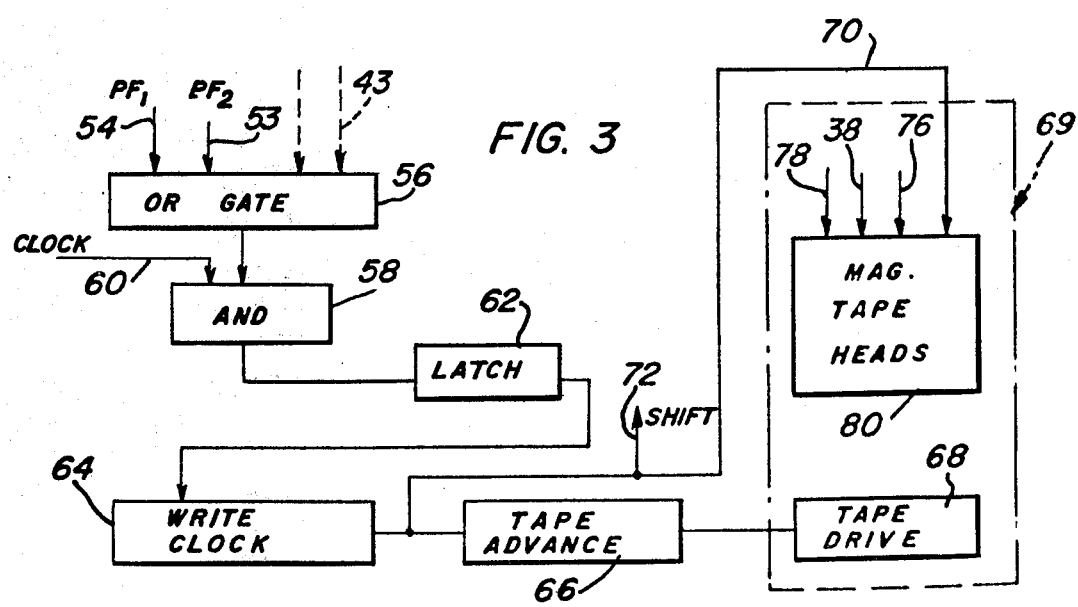
FIG. 3 is a block diagram of circuits in the present invention that causes actuation of a tape recorder.

Up to this point, the system has been discussed to explain the generation of event signals and speed-distance data. FIG. 3 illustrates that portion of the circuit which energizes the tape recorder of the system to record these events and measurements.

Referring to FIG. 3 an OR gate 56 is provided to detect the occurrence of either print function PF$_1$ (54) corresponding to 26 in FIG. 2, PF$_2$ (53), or the occurrence of an event such as 43. The output from gate 56 provides a first input to the AND gate 58, along with an input 60 from the clock 16. Upon the simultaneous occurrence of an input to gate 56 and a timing pulse along clock line 60, an output occurs at the gate 58 to set the latch 62. Once the latch 62 is set, the write clock 64 sends out regular pulses to the pulse shaping network 66 that provides sharply defined pulses to the tape drive 68. The tape drive 68 utilizes a stepping motor to increment the tape in a magnetic tape recorder module 69. The module may be unplugged from its connection with the remainder of the system for purposes to be described hereinafter.

The write clock 64 has its output serving a second function in addition to advancing the tape of the module 69. The second function is to provide a shift signal 72 to the speed register 22 (FIG. 2), the event register 44, and the distance register 36 (FIG. 2). When a shift signal is applied on line 72 to the registers 22, 36, and 44, the data contained in these respective registers are shifted out serially to respective inputs of multi-channel magnetic tape heads 80, which also form part of the magnetic tape recorder module 69. The heads 80 illustrate four inputs (38, 70, 76, 78) for four channels of recording. However, as will be appreciated this is merely exemplary. In an operating version of the present invention, a greater number of channels could be used. The shift line 72 is connected in shunt with lead 70 to provide a synchronizing input to the magnetic tape heads 80. Thus, the tape will have data channels recorded thereon, along with a channel of synchronizing pulses that alternate in polarity to effect a sequential train of alternating binary ones and zeroes. The synchronizing track is important to synchronize the channels of data during playback, to be discussed hereinafter.

The mini-tape recorder module may be of the type commercially available from the Borg-Warner Corporation.

Figure 4:
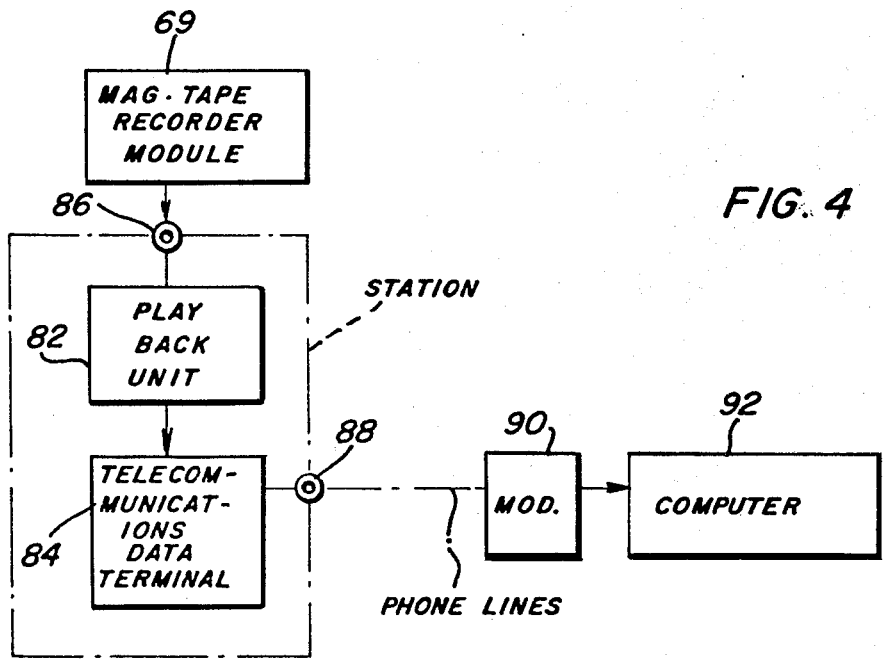
FIG. 4 is a schematic block diagram illustrating the playback mode of the recorded data. As will be noted, the data is transmitted to a computer for data editing and analysis.

FIG. 4 illustrates the playback mode for the tape recorder contained within the module 69. It will be noted that the recorder module is initially installed in the system of the present invention, on board a vehicle. In one intended use of the invention, the tape recorder module is removed from this system when the vehicle comes to a rest stop. The module is then delivered to a ground dispatch station while a second tape recorder module is installed in the system for further data recording on board the vehicle. FIG. 4 illustrates the dispatch station as being generally indicated as STATION. At this station is a playback unit 82, that accepts the output signal from module 69, for playback. A plug in jack 86 is schematically illustrated to illustrate the plug-in connection between the module 69 and the playback unit 82. The playback unit 82 is then connected with a conventional telecommunications data terminal 84, such as Teletypewriter. The data terminal has an output 88 that is connected to telephone lines, in a well known manner. At the opposite end of the telephone lines is a receiver terminal that may use a conventional modem 90 that has its output connected to a data processing system or computer 92. The computer is programmed to accept the data fed thereto and by means of an edit routine, the data may be analyzed and prepared in report form. The data that is recorded on the tape and then played back, as shown in FIG. 4, may be encoded in accordance with the conventional ASCII code. This type of code transmission is conventional in telecommunications data terminals.

After the data has undergone data processing, a final printout report may be constructed that furnishes analysts with a data analysis that they are used to. As will be appreciated, by using the plug-in module, it is a simple matter for a vehicle operator to remove the module 69 with data contained on its tape. Thereafter, the data may be transmitted to the data processing system anywhere in the nation, as long as the ground station to which the module is delivered, has a compatible telecommunications data terminal 84. Inasmuch as a majority of telecommunications data terminals have standardized outputs, utilizing the ASCII code, this doesn't present a problem.

It should be understood that the invention is not limited to the exact details of construction shown and described herein for obvious modifications will occur to persons skilled in the art.

What is claimed is:

1. A vehicle data recorder-playback system comprising:
   a portable tape recorder module for recording and playing back vehicle engineering operation data, the module including;
   a. a self-contained magnetic tape,
   b. magnetic tape head means contacting the tape for reading data in and out of the tape,
   c. means for driving the tape across the head means,
   a ground station including;
   d. playing back means removably connected with the module for controlling data playback,
   e. connector means located on the module and the playing back means for facilitating insertion and removal of the module from the playing back means, and
   f. means connected to the output of the playing back means for communicating played back data to a remote data processing station.

2. The subject matter set forth in claim 1 wherein the communicating means comprises a telecommunication data terminal connected to a first end of phone lines.

3. The subject matter set forth in claim 2 together with a modem connected at a second end of the phone lines for reconstructing the played back data.

4. The subject matter set forth in claim 3 together with a computer connected to the modem output for processing the reconstructed data.

* * * * *